(12) United States Patent
Kato et al.

(10) Patent No.: US 7,304,121 B2
(45) Date of Patent: Dec. 4, 2007

(54) LIQUID-CRYSTALLINE POLYESTER RESIN AND METHOD FOR PRODUCING IT

(75) Inventors: Hiroyuki Kato, Kawanishi (JP); Motoki Asahara, Sanda (JP); Tetsuhide Sawada, Nishinomiya (JP)

(73) Assignee: Kabushiki Kaisha Ueno Seiyaku Oyo Kenkyujo, Osaka-shi (JP)

( * ) Notice: Subject to any disclaimer, the term of this patent is extended or adjusted under 35 U.S.C. 154(b) by 56 days.

(21) Appl. No.: 11/179,683

(22) Filed: Jul. 13, 2005

(65) Prior Publication Data

US 2006/0036058 A1    Feb. 16, 2006

(30) Foreign Application Priority Data

Jul. 14, 2004    (JP)    ............... 2004-207118

(51) Int. Cl.
*C08G 63/00*    (2006.01)
(52) U.S. Cl. ............... 528/176; 264/176.1; 264/219; 528/190; 528/192; 528/193; 528/194
(58) Field of Classification Search ............ 264/176.1, 264/219; 528/190, 192, 193, 194
See application file for complete search history.

(56) References Cited

U.S. PATENT DOCUMENTS

| | | | |
|---|---|---|---|
| 4,311,823 A | 1/1982 | Imai et al. | |
| 4,639,504 A | 1/1987 | Cottis | |
| 4,742,149 A | 5/1988 | Finestone | |
| 4,849,499 A | 7/1989 | Fagerburg et al. | |
| 5,015,723 A | 5/1991 | Sugimoto et al. | |
| 5,237,038 A | 8/1993 | Morris et al. | |
| 5,393,848 A | 2/1995 | Charbonneau et al. | |
| 6,121,369 A | 9/2000 | Stack et al. | |
| 6,582,625 B2 | 6/2003 | Nagashima et al. | |
| 2003/0008979 A1 | 1/2003 | Suenaga et al. | |
| 2004/0058137 A1 | 3/2004 | Okamoto et al. | |

FOREIGN PATENT DOCUMENTS

| | | |
|---|---|---|
| EP | 0357079 A2 | 3/1990 |
| EP | 0357207 A2 | 3/1990 |
| EP | 0376323 A2 | 7/1990 |
| EP | 0490346 A1 | 6/1992 |
| EP | 1312631 A2 | 5/2003 |
| JP | 62-235321 | 10/1987 |
| JP | 01-294732 | 11/1989 |
| JP | 11-246654 | 9/1999 |
| JP | 2000-248056 | 9/2000 |
| WO | WO 02/02717 A2 | 1/2002 |
| WO | WO 2004/058851 A1 | 7/2004 |

*Primary Examiner*—Terressa Boykin
(74) *Attorney, Agent, or Firm*—Sughrue Mion, PLLC

(57) ABSTRACT

The present invention provides a liquid-crystalline polyester obtainable by a method comprising the steps of: (1) preparing a prepolymer consisting of the repeating units represented by formulae (I), (II), (III) and (IV):

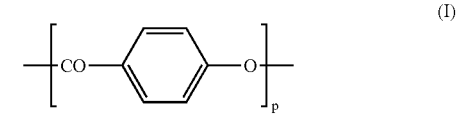

(I)

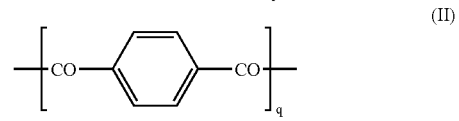

(II)

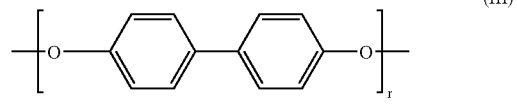

(III)

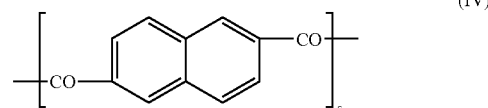

(IV)

wherein, p, q, r and s represent relative molar proportions (mol %) of the repeating units in the liquid-crystalline polyester resin and satisfy the following formulae: $60 \leq p \leq 80$, $10 \leq r \leq 20$, $10 \leq q+s \leq 20$, $0.05 \leq s/(q+s) \leq 0.3$, $p+q+r+s=100$; and (2) heating the prepolymer in substantially solid state at 250-350° C., provided that the liquid crystalline polyester has a deflection temperature under load of 280-340° C., and a melt viscosity of 10-60 Pa·s.

9 Claims, 1 Drawing Sheet

LIQUID-CRYSTALLINE POLYESTER RESIN AND METHOD FOR PRODUCING IT

TECHNICAL FIELD

The present invention relates to a wholly aromatic liquid-crystalline polyester resin and a method for producing the same.

BACKGROUND ART

Thermotropic liquid-crystalline polyester resin (which is called liquid-crystalline polyester resin or LCP hereinafter) has good properties including heat resistance, mechanical properties such as rigidity, chemical resistance and dimensional accuracy and is used not only for molded articles but also for a variety of products such as fibers and films. Particularly, personal computers and mobile phones employ highly integrated devices and the art wishes to use downsized, thinner and smaller parts for them. In the information and telecommunication fields, very thin parts, as thin as 0.5 mm or less of the thickness, are sometimes required. Based on the excellent molding properties of the LCPs including good flowability and less flash development compared to the other thermoplastic resins, consumption of the LCPs has been increasing.

Liquid-crystalline polyester resins which have good mechanical properties, thermal properties and an excellent moldability have been proposed. For example, Japanese Patent Application Laid open No. Hei. 01-294732 and U.S. Pat. No. 4,849,499 (the cited references are herein incorporated by reference) provide liquid-crystalline polyester resins produced by polymerizing monomers such as p-hydroxybenzoic acid, terephthalic acid, 2,6-naphthalene dicarboxylic acid and 4,4'-dihydroxybiphenyl by a method such as slurry polymerization method or molten acidolysis.

Recently, liquid-crystalline polyester resins are employed for a variety of uses wherein the LCPs are processed at a high-temperature such as solder-welding and infrared reflow-welding. However, the liquid-crystalline polyester resins produced by polymerization a method such as slurry polymerization or molten acidolysis not exhibit sufficient heat resistance.

In order to obtain a liquid-crystalline polyester resin with an excellent heat resistance, methods using solid phase polymerization have been proposed. For example, U.S. Pat. No. 6,582,625, Japanese Patent Application Laid Open No. 2000-248056 and Japanese Patent Application Laid Open No. Hei. 11-246654 (the cited references are herein incorporated by reference) disclose methods for producing liquid-crystalline polyester resins which comprise preparing powdery or pellet-formed prepolymer with a low polymerization degree and heating said prepolymer in solid phase to give polymers with high degree of polymerization.

As liquid-crystalline polyester resins obtained by said solid phase polymerization method, U.S. Pat. Nos. 5,015,723, 4,742,149, 4,639,504 and 4,311,823 (the references are herein incorporated by reference) disclose liquid-crystalline polyester resins composed of following monomers:
i) p-hydroxybenzoic acid,
ii) terephthalic acid,
iii) 4,4'-dihydroxybiphenyl,
iv) 2,6-dihydroxynaphthalene, and
v) aromatic diols such as hydroquinone.

In addition, Japanese Patent Application Laid Open No. Sho. 62-235321 (the cited reference is herein incorporated by reference) discloses a liquid-crystalline polyester resin composed of following monomers:
i) p-hydroxybenzoic acid,
iii) 4,4'-dihydroxybiphenyl,
iv) 2,6-dihydroxynaphthalene,
v) aromatic diols such as hydroquinone, and
vi) 2,6-naphthalene dicarboxylic acid.

Conventionally known liquid-crystalline polyester resins obtained by solid phase polymerization exhibit good heat resistance because of high degree of polymerization. However, such liquid-crystalline polyester resins have a relatively high melt point and high melt viscosity and therefore, their molding processability was not satisfactory. The art desires liquid-crystalline polyester resins which show both high heat resistance and excellent moldability.

The art also desires liquid-crystalline polyester resins containing no flame retarder such as harmful bromine compound which can exhibit good flame retardancy.

SUMMARY OF INVENTION

An object of the present invention is to provide a wholly aromatic liquid-crystalline polyester resin which exhibits high heat resistance and excellent properties. Another object of the present invention is to provide a method for producing the liquid-crystalline polyester resin. Further object of the present invention is to provide a liquid-crystalline polyester resin composition comprising the liquid-crystalline polyester resin of the present invention.

The present invention provides a liquid-crystalline polyester obtainable by a method comprising the steps of;
preparing a prepolymer consisting of the repeating units represented by formulae (I), (II), (III) and (IV):

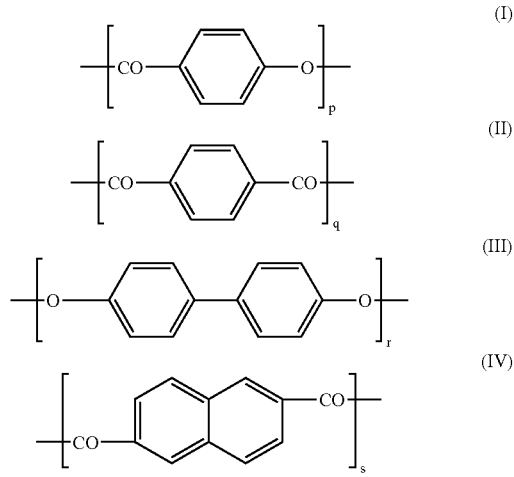

wherein, p, q, r and s represent relative molar proportions (mol %) of the repeating units in the liquid-crystalline polyester resin and satisfy the following formulae:

$60 \leq p \leq 80$ $10 \leq r \leq 20$ $10 \leq q+s \leq 20$ $0.05 \leq s/(q+s) \leq 0.3$ $p+q+r+s=100$; and heating the prepolymer in substantially solid state at 250-350° C., provided that the liquid crystalline polyester has a deflection temperature under load (DTUL) of 280-340° C., and a melt viscosity of 10-60 Pa·s, wherein the melt viscosity is determined at a temperature 30° C. higher than the crystalline melting temperature of the resin, which is determined by differential scanning calorimetry, and a shear rate of 1000 sec-1.

DETAILED DESCRIPTION OF THE INVENTION

Figure 1:
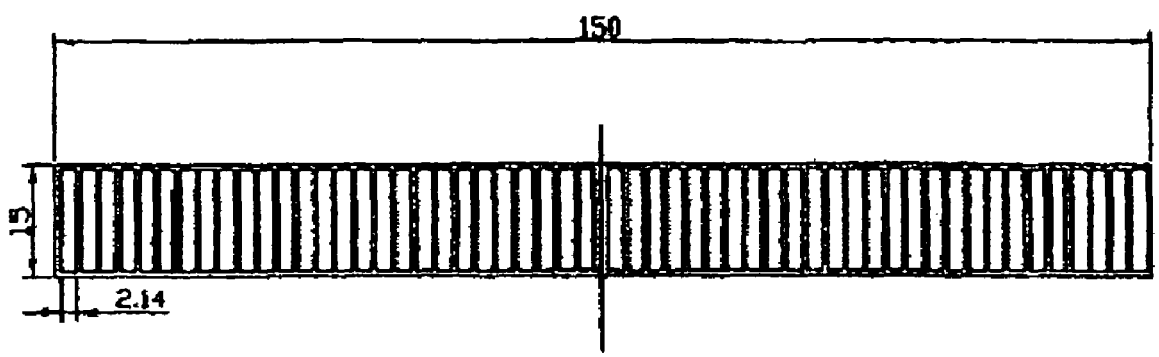
FIG. 1 is a schematic representation of harmonica-shaped die used for the assessment of molding flowability. The die has length of 150 mm, width of 15 mm and depth of 10 mm. It has 54 grids and a side gate of 5 mm×0.5 mm.

The liquid-crystalline polyester resin of the present invention is not specifically limited and may be any polyester resin which exhibits anisotropic melt phase and is called as thermotropic liquid-crystalline polyester resin by those skilled in the art.

The anisotropic melt phase can be confirmed by means of conventional polarized light system using orthogonal light polarizer. In more detail, the sample on the Leitz's hot stage under nitrogen atmosphere may be observed with Leitz's polarization microscope.

The liquid-crystalline polyester resin of the present invention is composed of aromatic oxycarbonyl repeating unit, aromatic dioxy repeating unit and aromatic dicarbonyl repeating unit.

The liquid-crystalline polyester resin of the present invention comprises a p-oxybenzoyl repeating unit shown by formula (I) as aromatic oxycarbonyl repeating unit:

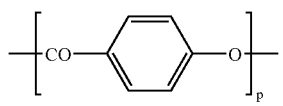

(I)

wherein p represents molar proportion (mol %) of repeating unit of formula (I) in the liquid-crystalline polyester resin.

According to the invention, the molar proportion of the repeating unit of formula (I) is 60-80 mol %, preferably 65-75 mol % based on the total repeating units in the liquid-crystalline polyester resin.

Examples of monomers which provide the repeating unit of formula (I) are p-hydroxybenzoic acid and ester forming derivatives such as acyl derivative, ester derivatives and acyl halide thereof.

The liquid-crystalline polyester resin of the present invention comprises aromatic dicarbonyl repeating units shown by formulae (II) and (IV):

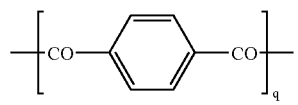

(II)

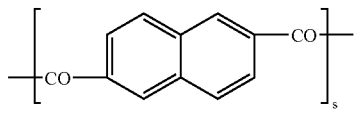

(IV)

wherein, q and s represent molar proportions (mol %) of repeating unit of formula (II) and formula (IV) in the liquid-crystalline polyester resin, respectively.

The total amount of the aromatic dicarbonyl repeating units of formula (II) and (IV) in the LCP of the present invention, represented as (q+s) is 10-20 mol %, preferably 12.5-17.5 mol % based on the total repeating units in the liquid-crystalline polyester resin.

According to the invention, q and s satisfy following formula; $0.05 \leq s/(q+s) \leq 0.3$, preferably $0.08 \leq s/(q+s) \leq 0.2$.

Examples of monomers which provide repeating units of formula (II) are terephthalic acid and ester forming derivatives, such as ester derivatives and acyl halide, thereof.

Examples of monomers which provide repeating units of formula (IV) are 2,6-naphthalene dicarboxylic acid and ester forming derivatives such as ester derivatives and acyl halide thereof.

The liquid-crystalline polyester resin of the present invention comprises aromatic dioxy repeating unit shown by formula (III):

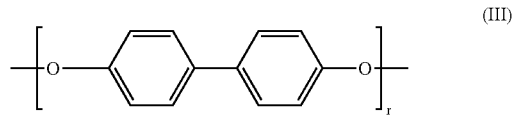

(III)

wherein, r represents molar proportion (mol %) of the repeating unit of formula (III) in the liquid-crystalline polyester resin.

According to the invention, the molar proportion of the repeating unit of formula (III) is 10-20 mol %, preferably 12.5-17.5 mol % based on the total repeating units in the liquid-crystalline polyester resin.

Examples of monomers which provide repeating units of formula (III) are 4,4'-dihydroxybiphenyl, and ester forming derivatives such as acyl derivative thereof.

In the liquid-crystalline polyester resin of the present invention, it is preferable that total molar amount of the aromatic dicarbonyl repeating units of formulae (II) and (IV) and the molar amount of the aromatic dioxy repeating unit of formula (III) are substantially equal.

The present invention provides a method for producing a liquid-crystalline polyester resin which comprises the steps of;

preparing a pellet of prepolymer consisting of the repeating units represented by formulae (I), (II), (III) and (IV):

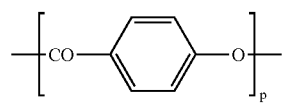

(I)

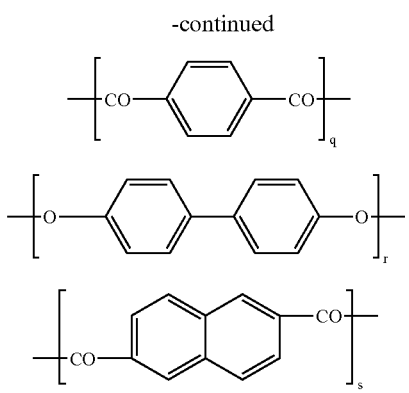

wherein, p, q, r and S represent relative molar proportions (mol %) of the repeating units in the liquid-crystalline polyester resin; and heating pellet of prepolymer in substantially solid state at 250-350° C.

In the above method, p, q, r and s represent relative molar proportions (mol %) of the repeating units in the liquid-crystalline polyester resin and preferably satisfy the following formulae;

$$60 \leq p \leq 80$$

$$10 \leq r \leq 20$$

$$10 \leq q+s \leq 20$$

$$0.05 \leq s/(q+s) \leq 0.3$$

$$p+q+r+s=100.$$

The liquid-crystalline polyester resin of the present invention is obtained by a method which comprises preparing prepolymer by polycondensation of monomers which provide the repeating units shown by formulae (I)-(IV) using known polycondensation methods such as molten acidolysis method and slurry polymerization method, and heating said prepolymer at 250-350° C.

The molten acidolysis method is preferably used for preparing the prepolymer of the present invention. In this method, the monomers are heated to give molten solution and then the solution is reacted to give the molten polymer. The final step of this method may be carried out under vacuum to facilitate removal of the volatile by-products such as acetic acid or water.

The slurry polymerization method is characterized in that monomers are reacted in a heat-exchange fluid to give solid state polymer in the form of suspension in the heat-exchange liquid medium.

In either of the molten acidolysis method or the slurry polymerization method, the polymerizing monomer components may be in the denatured form, i.e. as lower acyl ester, which can be obtained by esterifying the hydroxyl group. The lower acyl group may have preferably 2-5, more preferably 2-3 carbon atoms. Acetyl esters are most preferably used for the reaction.

The lower acyl esters of the monomers may be those prepared beforehand by acylating the monomers independently or may be those produced in the reaction system by adding an acylating agent such as acetic anhydride to the monomers upon preparing the prepolymer.

In either of the molten acidolysis method or the slurry polymerization method, a catalyst may be used in the reaction, if desired.

Examples of the catalysts include organic tin compounds such as dialkyl tin oxide (ex. dibutyl tin oxide) and diaryl tin oxide; organic titanium compounds such as titanium dioxide, antimony trioxide, alkoxy titanium silicate and titanium alkoxide; alkaline or alkaline earth metal salt of carboxylic acid such as potassium acetate; and gaseous acid catalysts such as Lewis acid (ex. $BF_3$) and halogenated hydrogen (ex. HCl).

In the present specification, the highest reaction temperature in the polymerization of prepolymers is referred as Tmax.

In the present invention, the term "prepolymer" refers to polymer with low degree of polymerization which is obtained by the polycondensation reaction and which is subjected to solid phase polymerization reaction afterward. The prepolymer has crystallization temperature (Tc) of from Tmax−60° C. to Tmax−5° C. and has crystalline melting temperature (Tm) of from Tmax−15° C. to Tmax+20° C. Preferably, the prepolymer has Tc of from Tmax−50° C. to Tmax−10° C. and Tm of from Tmax−10° C. to Tmax+10° C.

Tc and Tm are measured by the following procedures.

Method for Determining Tc and Tm

The differential scanning calorimeter Exstar 6000 (Seiko Instruments Inc., Chiba, Japan) or the same type of DSC device is used. The LCP sample to be examined is heated at a rate of 20° C./minute and endothermic peak (Tm1) is recorded. Thereafter, LCP sample is kept at a temperature 20-50° C. higher than Tm1 for 10 minutes. Then the sample is cooled to room temperature at the rate of 20° C./minute and exothermic peak (Tc) is recorded. Then, LCP sample is heated again at a rate of 20° C./minute. Endothermic peak found in the final step is recorded as melt point (Tm).

The prepolymer in molten state is pulled out of the polycondensation reaction vessel and is processed to give pellet, flake or powder form. Thereafter, the prepolymer is subjected to the solid phase polymerization process. The form of prepolymer is preferably pellet because of its good operationality on the solid phase polymerization. The structure of pellet is not limited and preferably is columnar structure. Columnar pellet can exhibit good flowability and dispersibility in the solid phase polymerization reaction vessel. By using such columnar pellet, unevenness of color and mechanical property can be reduced.

The shape of the cross section of the columnar structured pellet is not limited and preferably, is circular, elliptic or square, and more preferably circular or elliptic. In the present invention, the term "elliptic" shape means not only geometrical elliptic shape but also oval shape which has about linear portion in its circumference and appears as almost elliptic.

Preferably, the circular or elliptic cross section of the columnar pellet has a cross section diameter (when cross section is elliptic, major axis of cross section; and when cross section is infinite form, diameter of its circumcircle) of 2.5-4.0 mm and a pellet length of 2.5-5.0 mm.

The method of solid phase polymerization of the prepolymer in the form of pellet, flake or powder is not limited. The solid phase polymerization may be carried out by heating the prepolymer at 250-350° C. using an equipment such as multistage oven, rotary oven, hopper-typed reaction vessel, vertical reaction vessel and agitator vertical reaction vessel.

The solid phase polymerization is preferably carried out under an inert gas such as nitrogen, helium and argon gas or under reduced pressure. Under such conditions, the resultant liquid-crystalline polyester resin will take on good color tone. The degree of vacuum upon solid phase polymerization may be dependent on the apparatus employed. A high degree of vacuum is preferable so that the time period required for the solid phase polymerization becomes shorter.

The solid phase polymerization time is not especially limited. In general, it may be 3-20 hrs.

Thus obtained liquid-crystalline polyester resin of the present invention has DTUL determined according to ASTM D 648 of 280-340° C. and therefore, it exhibits an excellent heat resistance.

Moreover, the liquid-crystalline polyester resin of the present invention preferably has a melt viscosity as determined by capillary rheometer of 10-60 Pa·s, and especially 20-50 Pa·s. The liquid-crystalline polyester resin of the present invention exhibits excellent heat resistance and good moldability at the same time.

The melt viscosity is measured by the following method.

Method for Determining Melt Viscosity

Viscosity of liquid-crystalline polyester resin sample is measured with a melt viscosity measuring device (capillograph 1A, Toyo Seiki Seisaku-sho Ltd, Tokyo Japan) having capillary of 0.7 mmφ×10 mm. The measurement is carried out at a temperature of Tm+30° C. and a shear rate of 1000 sec-1. Thus obtained value is recorded as melt viscosity.

Furthermore, the crystalline melting temperature of liquid-crystalline polyester resin of the present invention determined by differential scanning calorimetry may preferably be 340-400° C., more preferably 340-380° C. The liquid-crystalline polyester resin exhibits good heat resistance, excellent moldability and sufficient stability upon molding.

The liquid-crystalline polyester resin composition of the present invention may be those obtained by admixing one or more fibrous, lamellar or particulate filler and/or reinforcement with the liquid-crystalline polyester resin.

Examples of fibrous fillers and/or reinforcements may include glass fiber, silica-alumina fiber, alumina fiber, carbon fiber and aramid fiber. Among them, glass fiber is preferable because of its good balance of physical properties and cost.

Examples of lamellar or particulate fillers and/or reinforcements may include talc, mica, graphite, wollastonite, calcium carbonate, dolomite, clay, glass flake, glass beads, barium sulfate and titanium oxide.

The fillers and/or reinforcements may be added to the liquid-crystalline polyester resin composition of the present invention in an amount of 0.1-200 parts by weight, preferably 10-100 parts by weight per 100 parts by weight of the liquid-crystalline polyester resin. If the amount of the fillers and/or reinforcements is more than 200 parts by weight, the moldability of the resulting liquid-crystalline polyester resin composition tends to be decreased or the exhausting of the cylinder or die of the molding device tends to be increased.

The liquid-crystalline polyester resin composition according to the present invention may further be admixed with one or more additives, which are conventionally used for resin compositions, if desired. For example, molding lubricant such as higher aliphatic acid, higher aliphatic ester, higher aliphatic amide, higher aliphatic acid metal salt ("higher" aliphatic herein used refers to C10-C25 aliphatic), polysiloxane and fluorocarbon resin; colorant such as dyes and pigments; antioxidant; thermal stabilizer; UV absorbent; antistatic agent; and surface active agent may be admixed.

The additives may be added to the liquid-crystalline polyester resin composition of the present invention in an amount of 0.05-1 parts by weight, preferably 0.1-0.5 parts by weight per 100 parts by weight of the liquid-crystalline polyester resin.

Molding lubricants such as higher aliphatic acid, higher aliphatic ester, higher aliphatic acid metal salt or fluorocarbon-type surfactant may be added to the pellets of the liquid-crystalline polyester resin or the liquid-crystalline polyester resin composition before subjecting the pellets to the molding process, so that the agent adhere to the outer surface of the pellet.

The liquid-crystalline polyester resin composition of the present invention may comprise one or more additional resin component unless the additional resin component does not impair the object of the present invention. Examples of the additional resin components include thermoplastic resins such as polyamide, polyester, polyphenylene sulfide, polyether ketone, polycarbonate, polyphenylene ether and denatured derivatives thereof, polysulfone, polyethersulfone and polyether imide and thermosetting resins such as phenol resin, epoxy resin and polyimide resin. The amount of the additional resin component is not limited, and may be determined dependent on the intended property. Typically, such additional resins may be added to the liquid-crystalline polyester resin composition in an amount of 1-200 parts by weight, preferably 10-100 parts by weight per 100 parts by weight of the liquid-crystalline polyester resin.

The liquid-crystalline polyester resin composition of the present invention may be obtained by adding fillers, reinforcements, additives and the other resin components to the liquid-crystalline polyester resin and melt kneading the mixture using a kneading machine such as Banbury mixer, kneader, single screw extruder, twin screw extruder or the like at a temperature of from near Tm to Tm+20° C. Melt kneading may be carried out at a temperature higher than Tm +20° C., but at such a high temperature, the resin tends to be colored or charred.

The liquid-crystalline polyester resin of the present invention and the liquid-crystalline polyester resin composition comprising the same exhibit excellent flame retardancy. A 0.3-0.8 mm thick test specimen of the resin composition comprising no flame retarder exhibits V-0 grade flame retardancy according to UL-94 standard test method.

The liquid-crystalline polyester resin or the liquid-crystalline polyester resin composition according to the present invention may be molded using a conventional melt molding process, preferably injection molding, compression molding, extrusion molding and blow molding. The molded articles obtained with the liquid-crystalline polyester resin of the present invention exhibit excellent heat resistance and sufficient moldability and therefore, are particular useful for parts of electric and electronic devices, machines and automobiles.

Especially, the liquid-crystalline polyester resin of the present invention and the liquid-crystalline polyester resin composition comprising the same are suitably used for fine pitch connector and the like which require high heat resistance and good flowability.

The present invention is further described in reference to the following Examples.

EXAMPLE

In the examples, DTUL, flexural strength, tensile strength, flame retardancy, and flowability are assessed by the following procedures.

(1) DTUL

Test strip with length of 127 mm, width of 3.2 mm, and thickness of 12.7 mm was molded using injection molding machine (UH 1000-110, Nissei Plastic Industrial Co., Ltd.). Deflection temperature was measured using the test strip according to ASTM D 648 under load of 1.82 MPa and heating rate of 2° C./min.

(2) Flexural Strength

The same test strip used for determining DTUL was used. Flexural strength was measured according to ASTM D 790.

(3) Tensile Strength

ASTM D 638 type IV dumbbell-shaped specimen was molded using injection molding machine (UH1000-110, Nissei Plastic Industrial Co., Ltd., Tokyo Japan). Tensile strength was measured using the specimen according to ASTM D 638.

(4) Flame Retardancy

Test strip with length of 127 mm, width of 12.7 mm, and thickness of 0.8 mm or 0.3 mm was molded using injection molding machine (UH1000-110, Nissei Plastic Industrial Co., Ltd.). Flame test was carried out according to UL94 standard. Flame retardancy was recorded as total burning time of the first burning time and the second burning time of five strips.

(5) Molding Flowability

Harmonica-shaped die shown in FIG. 1 and a injection molding machine (UH1000-110, Nissei Plastic Industrial Co., Ltd.) were used. Resin was filled in the die at a predetermined cylinder temperature, at die temperature of 100° C., under injection pressure of 157 MPa and injection rate of 200 mm/s. Flowability was assessed as filling ratio of the resin. That is, the weight ratio of the filled resin to the amount of the resin when the die is completely filled with resin.

In the examples, following abbreviations are used.
POB: para-hydroxybenzoic acid
TPA: terephthalic acid
IPA: isophthalic acid
BP: 4,4'-dihydroxybiphenyl
NDA: 2,6-naphthalene dicarboxylic acid Example 1

<Production of Polymer with Low Degree of Polymerization>

POB (211 kg, 1529 moles), BP (61 kg, 328 moles), TPA (47 kg, 284 moles), NDA (9 kg, 44 moles), acetic anhydride (232 kg, 2271 moles) and potassium acetate (7 g, 0.07 mole) were fed in the 1 m$^3$ polymerization container made of SUS. and equipped with an agitating device and a heat exchanger. Under the nitrogen atmosphere, the mixture was heated from the room temperature to 145° C. over 2 hours and kept at 145° C. for 1 hour. Then the mixture was heated to 348° C. for seven hours with distilling out the by-product, acetic acid. The polymerization reaction was carried out at 348° C. for 50 minutes. When the torque became the predetermined level, polymerization container was sealed.

Then, nitrogen gas was induced to the container and the pressure in the polymerization container was increased to 0.2 MPa. The valve at the bottom of polymerization container was opened. The content of the polymerization container was pulled out through the dice of 3.5 mmφ×7 mm to give as strand. The strands were transferred to the cutter through the water-cooled carrier machine equipped just under the polymerization container. Then the strand was cut into pellet by the cutter. The pellet of polymer with low degree of polymerization was thus obtained.

The resultant pellet was columnar of about 4 mm long with circular cross of 3.4 mm diameter. The crystalline melting temperature of the obtained polymer with low degree of polymerization determined by differential scanning calorimetry was 349° C. and crystallization temperature of the same was 309° C.

<Solid Phase Polymerization>

10 kg of the pellet of thus obtained polymer with low degree of polymerization (i.e., prepolymer) was fed in 40L-tumble dryer. The temperature of the gas phase in the vessel of the dryer was 200° C. The gas phase was exchanged by nitrogen gas. The vessel of the dryer was heated under nitrogen flow of 120 L/hour, so that the gas phase was heated to 300° C. over 1 hour with rotating the dryer at 15 rpm. At the temperature, solid phase polymerization was carried out for seven hours.

After the solid phase polymerization was completed, the gas phase was cooled to 200° C. and rotation of the dryer was stopped. Then, flange of the dryer was opened and the pellets of the liquid-crystalline polyester resin were ejected. At this time, adhesion among the pellets was not observed and pellets were easily pulled out of the dryer. The resulting liquid-crystalline polyester resin obtained by the solid phase polymerization exhibited anisotropy in molten state as observed by polarization microscope equipped with hot-stage.

DTUL of this liquid-crystalline polyester resin was 330° C., crystalline melting temperature was 374° C. and melt viscosity was 42 Pa·s.

To 70 weight parts of the obtained liquid-crystalline polyester resin, 30 weight parts of glass fiber (chopped strand 03-T-747-GH, Nippon Electric Glass Co. Ltd., Shiga, Japan) was admixed. The mixture was subjected to pelletization using twin screw extruder (TEX30 α-35BW-2V, The Japan Steel Works, LTD., Tokyo, Japan) with cylinder temperature of 390° C. and screw rotation speed of 400 rpm to give liquid-crystalline polyester resin composition. DTUL of the liquid-crystalline polyester resin composition was 320° C., flexural strength was 190 MPa, and tensile strength was 152 MPa. With respect to flame retardancy, total burning time of 0.8 mm thick test piece was 30.2 seconds, while that of 0.3 mm thick was 13.9 seconds. Both of the 0.8 mm- and 0.3 mm-thick pieces did not produce drop of resin or other droppings which burned surgical cotton and flame retardancy was V-0 grade. In addition, flowability upon molding was examined at a cylinder temperature of 390° C. The resin filling ratio to harmonica-shaped die was 57.1%.

Accordingly, the liquid-crystalline polyester resin obtained was excellent with respect to heat resistance (DTUL), molding flowability, as well as flame retardancy.

Properties of the polymer with low degree of polymerization (i.e. prepolymer) and the liquid-crystalline polyester resin obtained after solid phase polymerization were shown in Table 1.

Comparative Example 1

<Production of Polymer with Low Degree of Polymerization>

POB (151 kg, 1092 moles), BP (102 kg, 546 mmoles), TPA (91 kg, 546 moles), acetic anhydride (236 kg, 2316 moles) and potassium acetate (38 g, 0.4 mole) were fed in polymerization container and polymer with low degree of polymerization was prepared by the same procedure as example 1.

The resultant pellet was columnar of 4 mm long with circular cross section of 3.4 mm diameter. The crystalline melting temperature of the obtained polymer with low degree of polymerization determined by differential scanning calorimetry was 349° C. and the crystallization temperature of the same was 326° C.

<Solid Phase Polymerization>

10 kg of the pellet of thus obtained polymer with low degree of polymerization (i.e., prepolymer) was subjected to solid phase polymerization by the same procedure as example 1 except that the temperature of the gas phase was 330° C. to give pellets of liquid-crystalline polyester resin. Adhesion among pellets was not observed and pellets were easily pulled out of the solid phase polymerization equipment.

The resulting liquid-crystalline polyester resin obtained by solid phase polymerization exhibited anisotropy in molten state as observed by polarization microscope equipped with hot-stage.

DTUL of this liquid-crystalline polyester resin was 336° C., crystalline melting temperature was 403° C. and melt viscosity could not be measured by the same procedures as Example 1 due to its high crystalline melting temperature.

To the obtained liquid-crystalline polyester resin, glass fiber was admixed and liquid-crystalline polyester resin composition was prepared by the same procedures as Example 1. DTUL of the liquid-crystalline polyester resin composition was 337° C., flexural strength was 135 MPa and tensile strength was 130 MPa. With respect to flame retardancy, when test piece with thickness of 0.8 mm was examined, total burning time was 50.3 seconds. The piece did not produce drop of resin or other droppings which burned surgical cotton and frame retardancy was V-1 grade. Molding flowability was examined at a cylinder temperature of 400° C. The resin filling rate to harmonica-shaped die was 26.7%.

In conclusion of the comparative example 1, the liquid-crystalline polyester resin was excellent with respect to heat resistance (DTUL), however, it was not satisfactory in molding flowability or flame retardancy.

Properties of the polymer with low degree of polymerization (i.e., prepolymer) and the liquid-crystalline polyester resin obtained after solid phase polymerization were shown in Table 1.

Comparative Example 2

<Production of Polymer with Low Degree of Polymerization>

POB (181 kg, 1310 moles), BP (82 kg, 437 moles), TPA (62 kg, 371 moles), IPA (11 kg, 66 moles), acetic anhydride (236 kg, 2316 moles) and potassium acetate (37 g, 0.4 moles) were fed in polymerization container and polymer with low degree of polymerization was prepared by the same procedure as example 1.

The resultant pellet was columnar of 3.7 mm long with circular cross section of 3.2 mm diameter. The crystalline melting temperature of the obtained polymer with low degree of polymerization determined by differential scanning calorimetry was 348° C. and the crystallization temperature of the same was 315° C.

<Solid Phase Polymerization>

10 kg of the pellet of thus obtained polymer with low degree of polymerization (i.e., prepolymer) was subjected to solid phase polymerization by the same procedure as example 1 to give pellets of liquid-crystalline polyester resin. Adhesion among pellets was not observed and pellets were easily pulled out of the solid phase polymerization equipment.

The resulting liquid-crystalline polyester resin obtained by solid phase polymerization exhibited anisotropy in molten state as observed by polarization microscope equipped with hot-stage.

DTUL of this liquid-crystalline polyester resin was 314° C., crystalline melting temperature was 375° C. and melt viscosity was 72 Pa·s.

To the obtained liquid-crystalline polyester resin, glass fiber was admixed and liquid-crystalline polyester resin composition was prepared by the same procedures as Example 1. The DTUL of the liquid-crystalline polyester resin composition was 322° C., flexural strength was 194 MPa and tensile strength was 143 MPa.

With respect to flame retardancy, when test piece with thickness of 0.8 mm was examined, total burning time was 57.7 seconds. The piece did not produce drop of resin or other droppings which burned surgical cotton and flame retardancy was V-1 grade. Molding flowability was examined at a cylinder temperature of 390° C. The resin filling rate to harmonica-shaped die was 48.7%.

In conclusion of the comparative example 2, the liquid-crystalline polyester resin was excellent with respect to heat resistance (DTUL), however, it was not satisfactory in molding flowability or flame retardancy.

Properties of the polymer with low degree of polymerization (i.e., prepolymer) and the liquid-crystalline polyester resin obtained after solid phase polymerization were shown in Table 1.

Comparative Example 3

<Production of Polymer with Low Degree of Polymerization>

POB (211 kg, 1529 moles), BP (57 kg, 306 moles), TPA (11 kg, 66 moles), NDA (52 kg, 240 moles), acetic anhydride (236 kg, 2314 moles) and potassium acetate (37 g, 0.4 moles) were fed in polymerization container and polymer with low degree of polymerization was prepared by the same procedure as example 1.

The resultant pellet was columnar of 3.9 mm long with circular cross section of 2.8 mm diameter. The crystalline melting temperature of the obtained polymer with low degree of polymerization determined by differential scanning calorimetry was 317° C. and the crystallization temperature of the same was 272° C.

<Solid Phase Polymerization>

10 kg of the pellet of thus obtained polymer with low degree of polymerization (i.e., prepolymer) was subjected to solid phase polymerization by the same procedure as example 1 except that temperature of the gas phase was 275° C. to give pellets of liquid-crystalline polyester resin. Adhesion among pellets was not observed and pellets were easily pulled out of the solid phase polymerization equipment.

The resulting liquid-crystalline polyester resin obtained by solid phase polymerization exhibited anisotropy in molten state as observed by polarization microscope equipped with hot-stage.

DTUL of this liquid-crystalline polyester resin was 259° C., crystalline melting temperature was 316° C. and melt viscosity was 113 Pa·s.

To the obtained liquid-crystalline polyester resin, glass fiber was admixed and liquid-crystalline polyester resin composition was prepared by the same procedures as Example 1. DTUL of the liquid-crystalline polyester resin composition was 275° C., flexural strength was 216 MPa and tensile strength was 186 MPa. With respect to flame retardancy, when test piece with thickness of 0.8 mm was examined, total burning time was 51.5 seconds. The piece did not produce drop of resin or other droppings which burned surgical cotton and flame retardancy was V-1 grade. Molding flowability was examined at a cylinder temperature of 340° C. The resin filling rate to harmonica-shaped die was 66.4%.

In conclusion of the comparative example 3, the liquid-crystalline polyester resin was excellent with respect to molding flowability, however it was not satisfactory in heat resistance (DTUL) or flame retardancy.

Properties of the polymer with low degree of polymerization (i.e., prepolymer) and the liquid-crystalline polyester resin obtained after solid phase polymerization were shown in Table 1.

TABLE 1

|  | Example 1 | Comparative Example 1 | Comparative Example 2 | Comparative Example 3 |
|---|---|---|---|---|
| POB (mole %) | 70 | 50 | 60 | 71.4 |
| BP (mole %) | 15 | 25 | 20 | 14.3 |
| TPA (mole %) | 13 | 25 | 17 | 3.1 |
| NDA (mole %) | 2 | — | — | 11.2 |
| IPA (mole %) | — | — | 3 | — |
| Ratio of dicarboxylic acid *1 | 0.13 | 0 | 0.15 | 0.78 |
| Tmax | 348° C. | 348° C. | 348° C. | 348° C. |
| Tm (polymer with low degree of polymerization, or prepolymer) | 349° C. | 349° C. | 348° C. | 317° C. |
| Tc (polymer with low degree of polymerization, or prepolymer) | 309° C. | 326° C. | 315° C. | 272° C. |
| Solid phase polymerization Temperature | 300° C. | 330° C. | 300° C. | 275° C. |
| Solid phase polymerization time | 7 hours | 7 hours | 7 hours | 7 hours |
| Tm(polymer obtained after solid phase polymerization) | 374° C. | 403° C. | 375° C. | 316° C. |
| DTUL | 330° C. | 336° C. | 314° C. | 259° C. |
| Melt viscosity (Pa · s) | 42 | — | 72 | 113 |
| DTUL *2 | 320° C. | 337° C. | 322° C. | 275° C. |
| Flexural strength (MPa) *2 | 190 | 135 | 194 | 216 |
| Tensile strength (MPa) *2 | 152 | 130 | 143 | 186 |
| Flame retardancy (burning time) *2 | 30.2 s | 50.3 s | 57.7 s | 51.5 s |

TABLE 1-continued

|  | Example 1 | Comparative Example 1 | Comparative Example 2 | Comparative Example 3 |
|---|---|---|---|---|
| Flame retardancy (evaluation) *2 | V-0 | V-1 | V-1 | V-1 |
| Molding flowability (cylinder temperature) | 390° C. | 400° C. | 390° C. | 340° C. |
| Molding flowability (filling ratio) | 57.1% | 26.7% | 48.7% | 66.4% |

*1: Molar ratio of aromatic dicarboxylic acid calculated by the following formula:
(NDA or IPA)/((NDA or IPA) + TPA).
*2: Measured after admixing of glass fiber. With regard to flame retardancy, values were those examined using piece with thickness of 0.8 mm.

What is claimed is:

1. A liquid-crystalline polyester obtainable by a method comprising the steps of:

preparing a prepolymer consisting of the repeating units represented by formulae (I), (II), (III) and (IV):

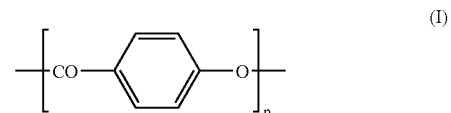
(I)

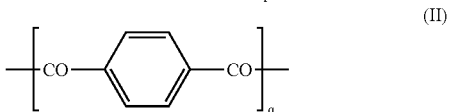
(II)

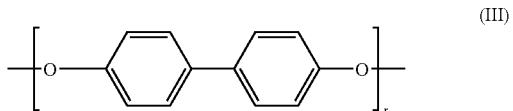
(III)

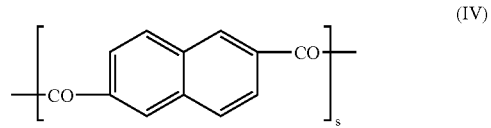
(IV)

wherein, p, q, r and s represent relative molar proportions (mol %) of the repeating units in the liquid-crystalline polyester resin and satisfy the following formulae:

$60 \leq p \leq 80$ $10 \leq r \leq 20$ $10 \leq q+s \leq 20$ $0.05 \leq s/(q+s) \leq 0.3$ $p+q+r+s=100$; and heating the prepolymer in solid state at 250-350° C., provided that the liquid crystalline polyester has a deflection temperature under load of 280-340° C., and a melt viscosity of 10-60 Pa·s, wherein the melt viscosity is determined at a temperature 30° C. higher than the crystalline melting temperature of the resin, which is determined by differential scanning calorimetry, and a shear rate of 1000 sec-1.

2. The liquid-crystalline polyester resin according to claim 1, which has a crystalline melting temperature determined by differential scanning calorimetry of 340-400° C.

3. A liquid-crystalline polyester resin composition comprising 100 parts by weight of the liquid-crystalline polyester of claim 1 and 0.1-200 parts by weight of a fibrous, lamellar or particulate filler and/or reinforcement.

4. The liquid-crystalline polyester resin composition according to claim 3, wherein said filler and/or reinforcement is glass fiber.

5. The liquid-crystalline polyester resin composition according to claim 3, wherein a 0.3-0.8 mm thick plate of the liquid-crystalline polyester resin composition exhibits V-0 grade flame retardancy according to UL-94 standard.

6. A molded article obtained by molding the liquid-crystalline polyester resin according to claim 1.

7. A molded article obtained by molding the liquid-crystalline polyester resin composition according to claim 3.

8. Method for producing a liquid-crystalline polyester resin which comprises the steps of:
preparing a pellet of prepolymer consisting of the repeating units represented by formulae (I), (II), (III) and (IV):

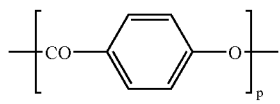 (I)

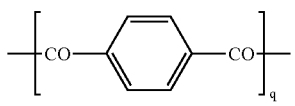 (II)

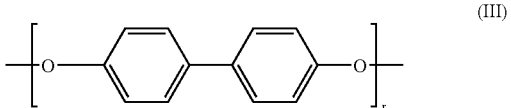 (III)

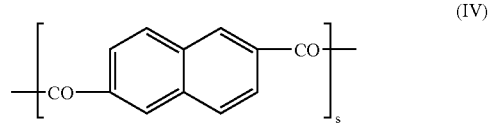 (IV)

wherein, p, q, r and s represent relative molar proportions (mol %) of the repeating units in the liquid-crystalline polyester resin and satisfy the following formulae:

$60 \leq p \leq 80$ $10 \leq r \leq 20$ $10 \leq q+s \leq 20$ $0.05 \leq s/(q+s) \leq 0.3$ $p+q+r+s=100$; and heating the pellet of prepolymer in solid state at 250-350° C.

9. The method according to claim 8, wherein said pellet is columnar with circular or elliptic cross section with cross section diameter (when cross section is elliptic, major axis of cross section) of 2.5-4.0 mm and with pellet length of 2.5-5.0 mm.

* * * * *